US006522432B1

United States Patent
Lin

(10) Patent No.: US 6,522,432 B1
(45) Date of Patent: Feb. 18, 2003

(54) IMAGE SCANNER WITH AUTOMATIC SIGNAL COMPENSATION

(75) Inventor: Chien-Chih Lin, Hsien (TW)

(73) Assignee: Primax Electronics Ltd., Taipei (TW)

( * ) Notice: Subject to any disclaimer, the term of this patent is extended or adjusted under 35 U.S.C. 154(b) by 1049 days.

(21) Appl. No.: 08/633,389

(22) Filed: Apr. 16, 1996

(51) Int. Cl.$^7$ ................................................. H04N 1/04
(52) U.S. Cl. ...................................... 358/475; 358/296
(58) Field of Search .................................. 358/296, 461, 358/463, 465, 475, 509, 512, 516, 484; 348/234, 500, 708

(56) References Cited

U.S. PATENT DOCUMENTS

| | | | | |
|---|---|---|---|---|
| 5,151,796 A | * | 9/1992 | Ito et al. ..................... | 358/475 |
| 5,212,376 A | * | 5/1993 | Liang ......................... | 358/484 |
| 5,249,068 A | * | 9/1993 | Takase ........................ | 358/475 |
| 5,278,674 A | * | 1/1994 | Webb et al. ................. | 358/475 |
| 5,296,944 A | * | 3/1994 | Suzuki et al. ............... | 358/475 |
| 5,587,746 A | * | 12/1996 | Nakakuki .................... | 348/708 |

* cited by examiner

*Primary Examiner*—Mark Wallerson
(74) *Attorney, Agent, or Firm*—Winston Hsu

(57) ABSTRACT

The present invention relates to an image scanner with automatic signal compensation function for compensating the instability of a light source of the image scanner. The image scanner comprises a test region, a light source for illuminating the document and the test region, optical means for conveying the light reflected from the document and the test region, a line image sensor for receiving the light from the optical means and generating an image signal corresponding to the light reflected from the document and a brightness signal corresponding to the light reflected from the test region, and a signal compensation circuit for amplifying the image signal according to the brightness signal to compensate the instability in the brightness of the light source.

9 Claims, 3 Drawing Sheets

IMAGE SCANNER WITH AUTOMATIC SIGNAL COMPENSATION

BACKGROUND OF THE INVENTION

1. Field of the Invention

The present invention relates to an image scanner, and signal compensation function for compensating the instability of a light source of the image scanner.

2. Description of the Prior Art

Fluorescent lamp such as cold cathode fluorescent tube (CCFT) is commonly used in color image scanner because of its broad spectrum coverage. One problem with such lamp is that its brightness will gradually change to a stable condition when it is powered on. Such period usually takes three to five minutes. In order to get a stable image output by using such a lamp, a user usually has to wait until the lamp is completely warmed up.

U.S. Pat. No. 5,212,376, which is assigned to the same assignee of the present invention, discloses an image scanner with an optic fiber connected to a line image sensor for measuring the brightness of the image scanner's light source and a signal compensation circuit for adjusting the brightness of the scanned image according to the measured brightness of the light source. The optic fiber method is very effective in measuring the brightness of the light source, but it requires high precision parts and installation process which is very expensive and time consuming. Besides, the brightness of the light measured by the optic fiber is very sensitive to the distance between the input end of the optic fiber and the light source. Any shock or vibration over the scanner may change this distance or move the input end of the optic fiber which may have great consequence over the output of the signal compensation circuit.

SUMMARY OF THE INVENTION

It is therefore a primary objective of the present invention to provide an image scanner which can measure the brightness of the scanner's light source to compensate a scanned image and avoid the above mentioned problem.

It is another objective of the present invention to provide an image scanner which can measure color variations of the scanner's light source to compensate the scanned image accordingly.

Briefly, in a preferred embodiment, the present invention includes an image scanner for scanning a document comprising:

(1) a test region;
(2) a light source for illuminating the document and the test region;
(3) optical means for conveying the light reflected from the document and the test region;
(4) a line image sensor for receiving the light from the optical means and generating an image signal corresponding to the light reflected from the document and a brightness signal corresponding to the light reflected from the test region; and
(5) a signal compensation circuit for amplifying the image signal according to the brightness signal to compensate the instability in the brightness of the light source.

The line image sensor comprises an array of (red, green, blue) (R,G,B) sensing elements for converting the light received from the optical means into an array of corresponding (R,G,B) signals wherein both the image signal and the brightness signals generated by the line image sensor are formed by an array of (R,G,B) signals. The signal compensation circuit comprises an A/D converter for digitizing the (R,G,B) signals of the image signal and the brightness signal, and a digital processor for adjusting the digitized (R,G,B) signals of the image signal according to the digitized (R,G,B) signals of the brightness signal. Each digitized (R,G,B) signal of the image signal is multiplied by a color compensation factor calculated which is obtained from the digitized (R,G,B) signals of the brightness signal to compensate the brightness and the color of the image signal.

It is an advantage of the present invention that it provides an image scanner which can measure the brightness of the scanner's light source by measuring the light reflected from the test region instead of by using an optic fiber.

It is another advantage of the present invention that the image scanner can measure color variations of the scanner's light source by measuring the light reflected from the test region to compensate the digitized RGB signals of the image signal.

These and other objects and the advantages of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 4 shows a curve of the brightness of the scanner's light source after it is powered on.

DETAILED DESCRIPTION OF THE PREFERRED EMBODIMENT

Figure 1:
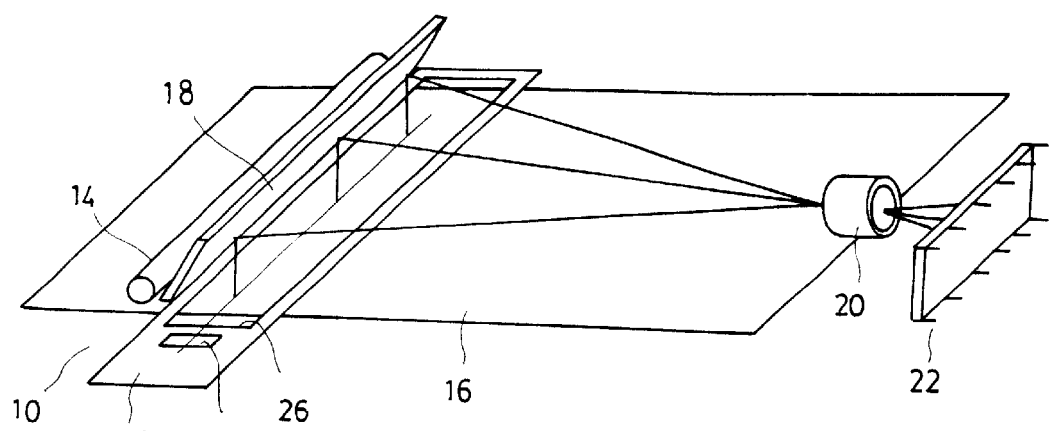
FIG. 1 is a perspective view of a hand-held image scanner's optical components according to the present invention.
Figure 2:
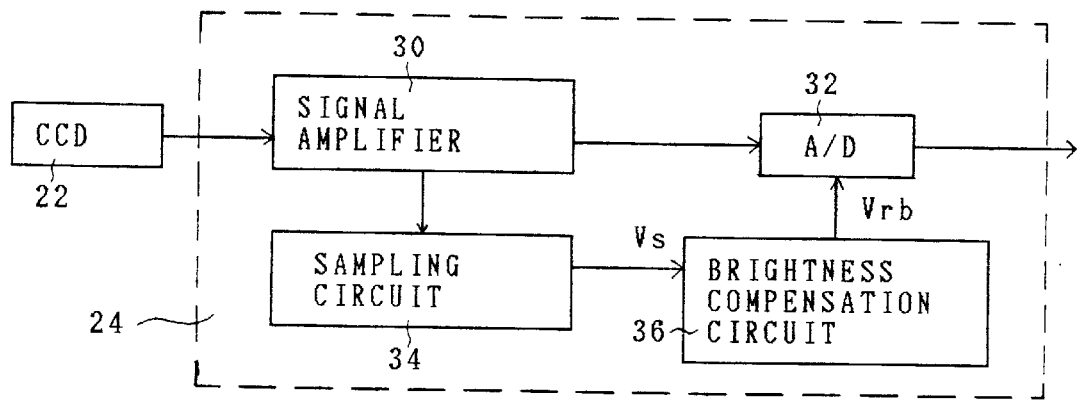
FIG. 2 is a hardware block diagram of the signal compensation circuit of the scanner according to the present invention.

Please refer to FIGS. 1 and 2. FIG. 1 is a perspective view of a hand-held image scanner's optical components according to the present invention and FIG. 2 is a hardware block diagram of the signal compensation circuit 24 attached to the CCD 22 shown in FIG. 1. The scanner 10 comprises a transparent window 26 for scanning a document 16 lying underneath, a rectangular glass 28 installed inside the window 26, a test region 12 installed on the glass 28 next to one side of the window 26, a light source 14 above the window 26 for illuminating a document 16 under the window 26 and the test region 12, an optical means which comprises a reflex mirror 18 and a lens 20 for conveying the light reflected from the document 16 and the test region 12, a line image sensor 22 which is a CCD (charge couple device) for receiving the light from the lens 20 and generating an image signal corresponding to the light reflected from the document 16 and a brightness signal corresponding to the light reflected from the test region 12, and a signal compensation circuit 24 for processing the brightness signal and amplifying the image signal according to the brightness signal to compensate the instability in the brightness of the light source 14. The test region 12 is of white color for measuring the brightness of the light source. The reflex mirror 18 is used for reflecting the light from the document 16 and the test region 12 and then the lens 20 will collimate the light reflected from the reflex mirror 18 to the line image sensor 22.

The signal compensation circuit 24 comprises a signal amplifier 30 for amplifying the image signal and brightness signal from the line image sensor 22 to an appropriate voltage level, an A/D (analog-to-digital) converter 32 for digitizing the amplified image signal according to an adaptable reference voltage Vrb, a sampling circuit 34 for sampling the brightness signal and generating a sample voltage Vs, and a brightness compensation circuit 36 for adjusting the reference voltage Vrb of the A/D converter 32 according to the sample voltage Vs to compensate the instability in the brightness of the light source 14.

Figure 3:
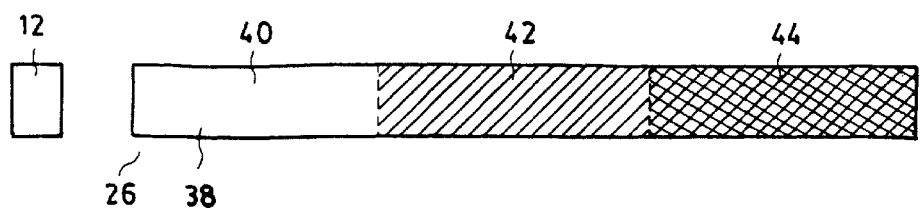
FIG. 3 shows the test region and a document viewed through a transparent window of the scanner.
Figure 4:
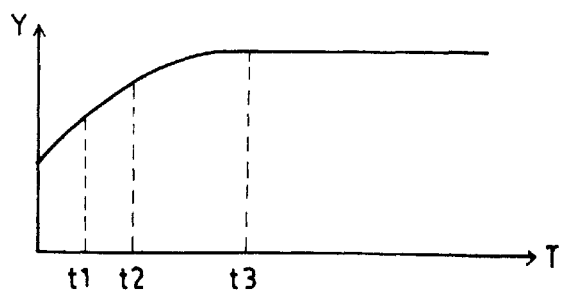
Figure 5:
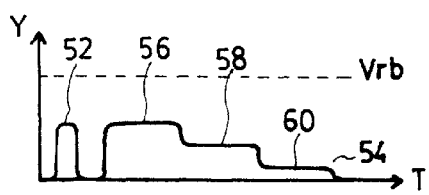
FIGS. 5 to 7 shows the brightness and image signals generated by the signal amplifier of the scanner.
Figure 6:
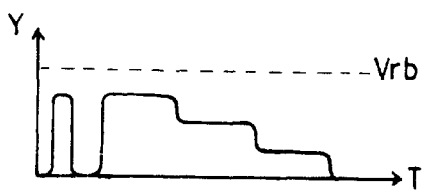
Figure 7:
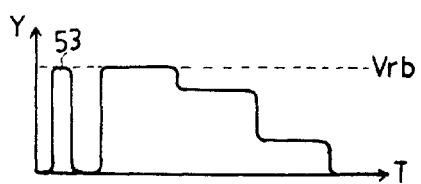

FIGS. 3 to 10 show an example which teaches how the test region 12 is used to compensate the instability in the brightness of the light source 14. FIG. 3 shows the test region 12 and a document 38 viewed through the transparent window 26 which comprises three different sections: white section 40, grey section 42 and black section 44. FIG. 4 shows a curve of the brightness (Y) of the light source 14 after it is powered on and three sampling points t1, t2 and t3. It shows that the brightness of the light source 14 is increasing at both point t1 and point t2, and it reaches a stable level at point t3. FIGS. 5 to 7 shows the brightness and image signals generated by the signal amplifier 30 at the three sampling points t1, t2 and t3. FIG. 5 shows a brightness signal 52 which is generated from the light reflected from the test region 12 and an image signal 54 generated from the light reflected from the document 38. The image signal 54 comprises three voltage levels 56, 58 and 60 which are corresponding to the three sections of the document 38: white section 40, grey section 42 and black section 44. The voltage level Vrb shown in FIGS. 5 to 7 is equal to the voltage level of the brightness signal 53 in FIG. 7 which is obtained when the brightness of the light source 14 reaches a stable condition.

Figure 8:
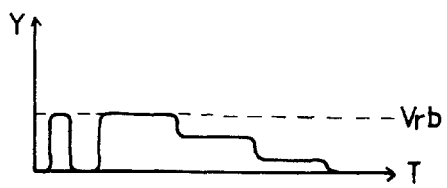
FIGS. 8 to 10 shown each of the resulting reference voltages Vrb generated by the brightness compensation circuit of the scanner.
Figure 9:
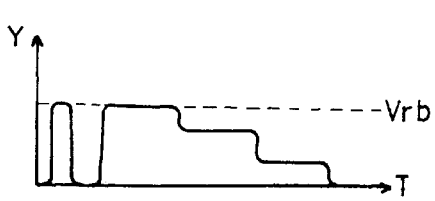
Figure 10:
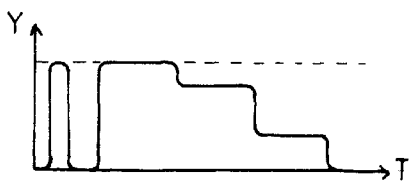

The A/D converter 32 shown in FIG. 2 digitizes the image signal 54 according to the reference voltage Vrb. If the Vrb is fixed at a constant level just like the one shown in FIGS. 5 to 7, the image signals shown in these three figures will be digitized into three different signal sets but in fact the only difference between these three signal sets is the brightness which is caused by the light source 14. In order to compensate such difference, the brightness signal 52 is fed into the brightness compensation circuit 36 to generate the reference voltage Vrb so that the digitized image signals generated by the A/D converter 32 at two different times will be the same if the images scanned at these two different times are the same. FIGS. 8 to 10 shown each of the resulting reference voltages Vrb generated by the brightness compensation circuit 36 at the three different points t1, t2 and t3.

Figure 11:
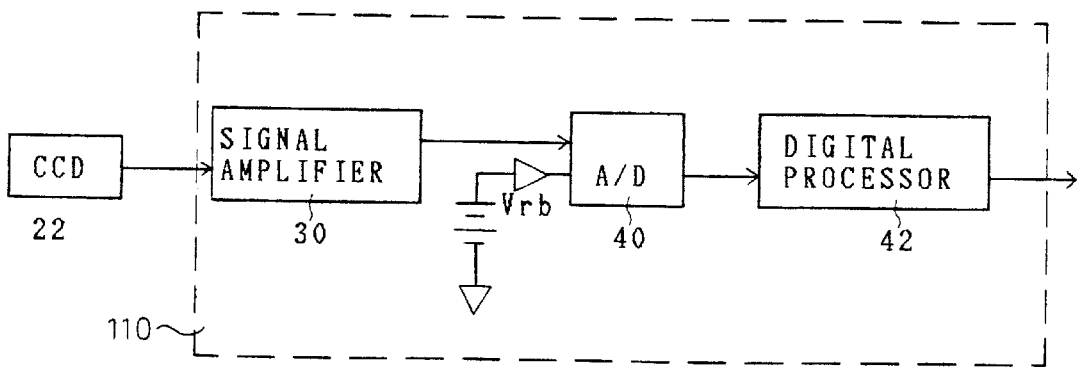
FIG. 11 is an alternative hardware block diagram of the signal compensation circuit.

FIG. 11 is an alternative block diagram of the signal compensation circuit 110. It comprises an A/D (analog-to-digital) converter 40 for digitizing the image signal and the brightness signal according to a fixed reference voltage Vrb, and a digital processor 42 for adjusting the digitized image signal according to the digitized brightness signal to compensate the instability in the brightness of the light source 14.

The line image sensor 22 comprises an array of red, green, blue (R,G,B) sensing elements (not shown) for converting the light received from the lens 20 into an array of corresponding (R,G,B) signals wherein both the image signal and the brightness signals generated by the line image sensor 22 are formed by an array of (R,G,B) signals. The A/D converter 40 digitizes the (R,G,B) signals of the image signal and the brightness signal according to the fixed reference voltage Vrb, and then the digital processor 42 adjusts the digitized (R,G,B) signals of the image signal according to the digitized (R,G,B) signals of the brightness signal to compensate the instability in the color of the light source.

Figure 12:
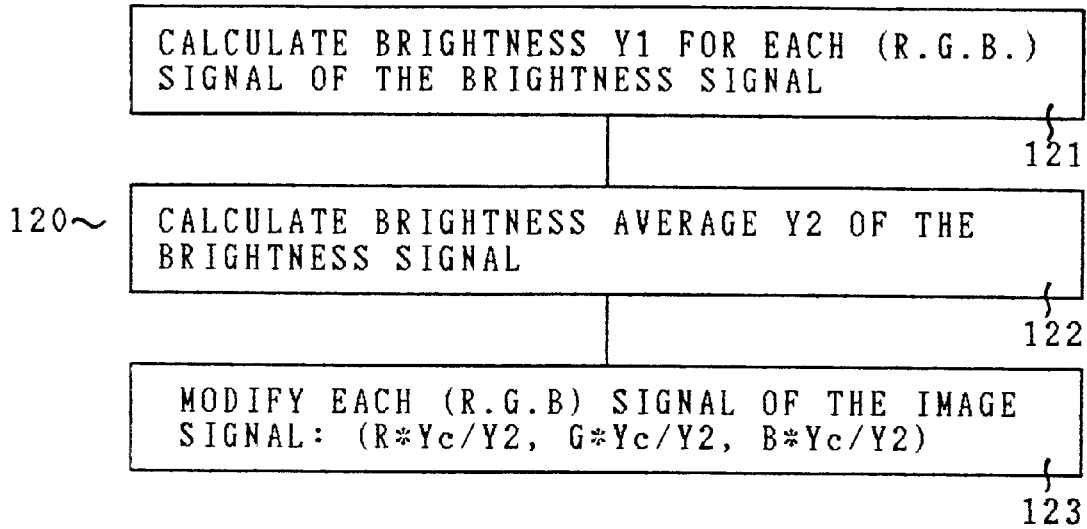
FIG. 12 shows a process for compensating the brightness of the image signal.
Figure 13:
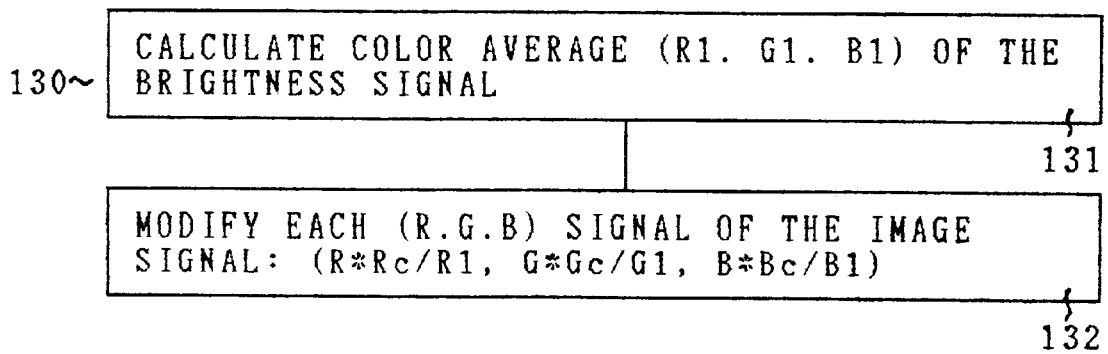
FIG. 13 shows another process for compensating both the brightness and the color of the image signal.

The brightness (Y) of a (R,G,B) signal can be represented in the equation listed below:

$$Y=a*R+b*G+c*B$$

where the a, b, and c are three predetermined constants. From this equation the brightness and color of the image signal's (R,G,B) signals can be compensated by using the digital processor 42. FIG. 12 shows a process for compensating the brightness of the image signal and FIG. 13 shows another process for compensating both the color and brightness of the image signal. In compensating the brightness or color of the image signal, a brightness reference Yc and a color reference (Rc,Gc,Bc) are used for adjusting each (R,G,B) signal of the image signal. The brightness reference Yc is approximately equal to the average brightness of the test region 12 when the light source is in a stable condition such as at the point t3 shown in FIG. 4, and the color reference (Rc,Gc,Bc) is the color average of the test region 12 obtained at the same time point.

FIG. 12 shows a process 120 which compensates the brightness of all the (R,G,B) signals of the image signal according to the (R,G,B) signals of the brightness signal. The process 120 comprises the following steps:

step 121 calculate a brightness Y1 for each (R,G,B) signal of the brightness signal by using the equation:

$$Y1=a*R+b*G+c*B$$

step 122 obtain a brightness average Y2 from the brightness Y1 of all the (R,G,B) signals of the brightness signal;

step 123 modify the brightness of the image signal by multiplying each (R,G,B) signal of the image signal by a brightness compensation factor (Yc/Y2): (R*Yc/Y2, G*Yc/Y2, B*Yc/Y2).

The process 120 can compensate the variations over the brightness of the light source 14 but can not compensate color variations over the light source. When the light source 14 is initially powered on, it usually shows a light blue color instead of a pure white color. Such color temperature change will affect the (R,G,B) signals of the image signal scanned from the document 16. By using the (R,G,B) signals of the brightness signal scanned from the test region 12 to measure the color of the light source, both the color and the brightness of the image signal can be compensated. FIG. 13 shows the process 130 which is used to compensate both the brightness and the color of the image signal. Process 130 comprises the following steps:

step 131 calculate a color average (R1,G1,B1) from all the (R,G,B) signals (R,G,B) of the brightness signal scanned from the test region 12;

step 132 multiply each (R,G,B) signal of the image signal scanned from the document 16 by a color compensation factor (Rc/R1, Gc/G1, Bc/B1): (R*Rc/R1, G*Gc/G1, B*Bc/B1).

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image scanner for scanning a document comprising:
   (1) a test region;
   (2) a light source for illuminating the document and the test region;
   (3) optical means for conveying the light reflected from the document and the test region;
   (4) a line image sensor for receiving the light from the optical means and generating an image signal corresponding to the light reflected from the document and a brightness signal corresponding to the light reflected from the test region; the line image sensor comprising an array of (red, green, blue)(R,G,B) sensing elements for converting the light received from the optical means into an array of corresponding (R,G,B) signals wherein both the image signal and the brightness signals generated by the line image sensor are formed by an array of (R,G,B) signals; and
   (5) a signal compensation circuit for amplifying the image signal according to the brightness signal to compensate the instability of the light source; the signal compensation circuit comprising an A/D converter for digitizing the (R,G,B) signals of the image signal and the brightness signal, and a digital processor for adjusting the digitized (R,G,B) signals of the image signal according to the digitized (R,G,B) signals of the brightness signal.

2. The scanner of claim 1 further comprising a transparent window for scanning the document wherein the test region is installed next to the window.

3. The scanner of claim 1 wherein the test region is of white color for measuring the brightness of the light source.

4. The scanner of claim 1 wherein the optical means comprises a reflex mirror for reflecting the light reflected from the document and the test region and a lens for collimating the light reflected from the reflex mirror to the line image sensor.

5. The image scanner of claim 1 wherein each of the digitized (R,G,B) signals of the image signal is multiplied by a brightness compensation factor which is obtained from the digitized (R,G,B) signals of the brightness signal to compensate the brightness of the image signal.

6. The image scanner of claim 5 wherein the brightness compensation factor is equal to Yc/Y2 over which Yc is the brightness average of the test region obtained when the light source is in a stable condition and Y2 is the brightness average of the brightness signal which is obtained by averaging the brightness of all the digitized (R,G,B) signals of the brightness signal.

7. The image scanner of claim 6 wherein the brightness Y of each (R,G,B) signal of the brightness signal is calculated according to the following equation:

$$Y=a*R+b*G+c*B$$

over which a, b, and c are three predetermined constants.

8. The image scanner of claim 1 wherein each digitized (R,G,B) signal of the image signal is multiplied by a color compensation factor calculated which is obtained from the digitized (R,G,B) signals of the brightness signal to compensate the brightness and the color of the image signal.

9. The image scanner of claim 8 wherein the color compensation factor is equal to (Rc/R1,Gc/G1,Bc/B1) over which the color reference (Rc,Gc,Bc) is the color average of the test region obtained when the light source is in a stable condition and the color average (R1,G1,B1) is the average of all the digitized (R,G,B) signals of the brightness signal.

* * * * *